(12) United States Patent
Peng et al.

(10) Patent No.: US 6,704,657 B2
(45) Date of Patent: Mar. 9, 2004

(54) METHOD AND APPARATUS FOR DETERMINING BLASTER DETONATION TIME AND FIRST ARRIVAL TIME OF SEISMIC WAVE

(75) Inventors: Shulin Peng, Puyang (CN); Weiwei Zhao, Puyang (CN); Lixin Wang, Puyang (CN); Xiaoxi Liu, Puyang (CN)

(73) Assignee: China Petroleum & Chemical Corporation, Beijing (CN)

( * ) Notice: Subject to any disclaimer, the term of this patent is extended or adjusted under 35 U.S.C. 154(b) by 0 days.

(21) Appl. No.: 09/860,354

(22) Filed: May 18, 2001

(65) Prior Publication Data

US 2002/0038183 A1 Mar. 28, 2002

(30) Foreign Application Priority Data

May 18, 2000 (CN) .......................................... 00107474 A

(51) Int. Cl.[7] .............................. G01V 1/00; G01V 1/06
(52) U.S. Cl. ......................................... 702/14; 181/116
(58) Field of Search ........................... 702/14; 73/35.15, 73/597; 367/13; 181/116

(56) References Cited

U.S. PATENT DOCUMENTS

| 594,472 | A | | 11/1897 | Higgins |
| 3,878,790 | A | | 4/1975 | Meyer ........................ 102/70.2 |
| 3,891,963 | A | * | 6/1975 | Herbert, Jr. .................. 367/55 |
| 4,066,994 | A | * | 1/1978 | Patchett et al. ............... 367/81 |
| 4,699,241 | A | * | 10/1987 | Kerekes ...................... 181/116 |
| 4,933,911 | A | * | 6/1990 | Sondergeld et al. .......... 367/13 |
| 4,985,873 | A | | 1/1991 | Eyl et al. ...................... 367/27 |
| 5,058,078 | A | | 10/1991 | Eyl et al. ...................... 367/26 |
| 5,736,936 | A | | 4/1998 | Bombay et al. ......... 340/853.1 |
| 5,907,132 | A | * | 5/1999 | Hardage ...................... 181/116 |

* cited by examiner

Primary Examiner—John Barlow
Assistant Examiner—Toan M Le
(74) Attorney, Agent, or Firm—Pennie & Edmonds LLP

(57) ABSTRACT

The present invention comprises an apparatus and a method for measuring the first arrival time of seismic waves from detonation in seismic explorations, comprising a or several detectors for measuring seismic waves and converting them into electrical signals and a signal processing means for calculating an average energy of the electrical signals to determine the first arrival time of seismic waves and using a smooth filtering method to compute accurately the first arrival time backwards from the first maximum valve in the average energy curve.

5 Claims, 7 Drawing Sheets

METHOD AND APPARATUS FOR DETERMINING BLASTER DETONATION TIME AND FIRST ARRIVAL TIME OF SEISMIC WAVE

FIELD OF THE INVENTION

The present invention relates to a method and an apparatus for accurately measuring propagation (traveling) time of the seismic wave, and more particularly, to a method and an apparatus for accurately determining the detonation time TB (also referred to as "time break") and the first arrival time (FAT) TR of the first arrival seismic wave (FASW) at the detonation uphole (or detonation point) in the field of seismic exploration.

BACKGROUND OF THE INVENTION

The method and the apparatus used in the prior art have considerable limitation on the determination of the detonation time, the accurate detonation time can not be acquired properly.

It should be noted that the article "Optical fiber time break", GEOPHSICS V61, No. 1, pp. 294–298, January–February 1996 (ISSN00168033), is worth notice. The technique revealed by this article and the method used therein are the insertion of a optical fiber into the explosive package with an end inserted into the explosive package as the signal detecting end to detect the high light emerged at the explosion of the explosive; and the light signal caused by the explosion is monitored at the other end of the optical fiber, with the output time of the light signal at the monitoring end being the explosion time. This method is both scientific and accurate, without the detection of the signal being subjected to electromagnetic interference (Very strong electromagnetic occurs at ignition), while this method is very good, it is not appropriate for mass production of seismic waves due to its high cost of materials and complicated construction, the cost of which is too high in mass application.

It should be noted that there is another method applicable under special conditions, a conductor is wound around the detonator, upon the detonation of the detonator, and the breaking time of the wire is taken as the detonation time. It should also be noted that this method is subject to strong electromagnetic interference, the detonation time determined by which is not so accurate as the determined by the above-mentioned optical detection method. As with the above-mentioned optical detection method, the construction cost in creases due to the increasing complexity of construction, the cost of which is also cost of which is also too high in mass application.

In addition, it should also be noted that a technique has been used in the recording of the detonation signal, with a detector placed at the detonation point in this technique to pick up the vibration produced in the detonation, then this signal is recorded on the instrument for final analyzing and determining the detonation time.

The technique extensively used by blasters (seismic source synchronizer) is the use of a transformer in the detonation means to couple and output the detonation current signal of the igniting detonator (snap cap, also referred to as "CAP"), and the detonation time is determined by the output current signal. This method can be used to roughly determine the detonation time TB, since there will be a certain delay in the detonation of igniting CAP, therefore, in this method, the "time break" signal is output after a certain delay following the detecting of the detonation current signal to indicate the detection of the detonation time. It can be seen that this method is rough, and thereby that is the limitation of this method which causes the under-improvement of the detonation time detecting method currently massively used in engineering.

In addition, there are following methods to detect the first arrival time of the first arriving wave: automatic fuzzy detection approach; inflexion point approach (differential approach); correlation approach; and extreme approach of correlation between seismic source signal and recording track. The automatic fuzzy detection approach introduces the basic concepts of artificial intelligence into the automatic pick-up of the first arriving waves in the multi-track seismic signals to improve the accuracy, reliability and applicability of detection. The creation of a subordination of function covers the "first arrival approach", "inflexion (differential) approach", "seismic focus signal and recording track correlation approach", "peak value approach" and "adjacent track correlation approach", after the creation of the subordination function, it is implemented by the following main steps:

(1) analyzing the seismic source sub-wave to obtain necessary parameters;

(2) applying the automatic detecting Chronos method and spatial correlation of the first arriving wave on the first track (or last track) of the record to roughly partition the ranges (or temporal and spatial windows) in which the first arrival resides;

(3) Detecting the first arrival time with various methods in the temporal and spatial window and determining various parameters necessary for determining the subordination function, and calculating corresponding subordination degree;

(4) Determining the first arrival time (automatic fuzzy detection approach) and relative parameters, a threshold $\lambda$ should be given to each subordination degree based on the characteristics of the first arrival time subordination degree obtained with various approaches, reserving those subordination degrees greater than $\lambda$ and resetting those less than $\lambda$, forming a matrix $\beta$ by each of the subordination degrees, and taking the $\lambda$-truncated matrix of $\beta$:$\beta_\lambda, \lambda \in [0,1]$ and letting $$S = \beta_\lambda \cap \beta$$

Normalizing S to obtain S', forming a matrix $T_f = (t_{f1}, t_{f2}, t_{f3}, t_{f4}, t_{f5})$ from the first as rival times obtained by various approaches, and finally we have the first arrival time $$t_f = T_f \cdot S'^t$$

(5) Repeating steps (2)–(4) until all the tracks having been detected.

The max error of this approach is 0.6 ms and its mean square error is 0.34 ms.

Inflexion approach (differential approach): There is always a point of max variation, referred to in the Method and Apparatus for Determining the Blaster's Detonation Time and the First arrival time, as point of inflexion, between the arrival time of the direct wave and the jumping of the waveform to the first Extremum point. The tangent at the inflexion paint intersects the time axis at to, and to is defined as the first arrival time of the direct wave.

The time obtained by this approach will be greater than the actual time, the max error is 2.2 ms and its mean square error is 1.09 ms, while the error of this approach is relatively high, the calculation is simple and also applicable to single track record.

Correlation approach (Adjacent tracks correlation): The initial time of the first arrival of the direct wave of a recording track is determined first using the "inflexion approach" or other approaches, then it is correlated with an adjacent track in a temporal window of the direct wave, the time difference $\tau_0$ between the first arrival time of the two tracks is obtained. Having known the first arrival time tx of the reference recording track, the first arrival time of the track to be obtained ty=tx+$\tau_0$ The max error of the time obtained by this approach is 1.2 ms, and its mean square error is 0.58 ms. If there is a relatively high error of the first arrival time tx of the reference recording track, the actual error will be increased.

Extremum approach of the correlation between the seismic focus signal and recording track:

The controllable seismic focus material is the result of one type of correlation, the Extremum point of which reflects the arrival time of the direct wave, therefore, the first arrival time can be determined by finding the maximum value (peak) or minimum value (valley) of the recordings.

The max error of time obtained by this approach is 1.2 ms, and its mean square root error is 0.63 ms.

First arrival-to-first arrival approach, peak(valley)-to-peak(valley) approach:

These two approaches can be used when pulsed seismic sources (e.g., air-gun, spark) are used and monitoring detectors are placed in the vicinity of the seismic source.

The first arrival-to-first arrival approach takes the first arrival output by the monitoring detector as reference, the first as rival time can be obtained by subtracting it form the first arrival of the recording track; the peak(valley)-to-peak (valley) approach takes the peak (valley) time output by the monitoring detector as reference, and the first arrival time is obtained by subtracting it form the peak (valley) time of the recording track.

The max error of this method is 1.5 ms, and its mean square root error is 0.84 ms.

First arrival time obtained by Partially smooth AR model:

The jumping time of the first arriving wave is obtained by a partially smooth AR model in the natural seismic monitoring, which is of higher anti-interference capability than that of the peak or valley pick up. This approach improves the sampling precision to a higher degree. This approach has been proved to be practical by experiments, but the error does not decrease as fast as the increase of sampling precision, it can hardly decrease when the mean square error root arrives about 0.35 ms.

21. It should be noted that the approaches used in natural seismic monitoring are different from that used in artificially activated seismic signal of seismic exploration record and detection, mainly in that the positions and conditions of the detecting points are different, the interference received by the detector in natural seismic monitoring is much less than that received by the detector in seismic exploration. Therefore, attention must be paid to the conditions of the use of this approach in seismic exploration.

For the above-mentioned prior art, except that the inflexion approach (differential approach) and partially smooth AR model approach can be used on single track recording, other approaches must be used with the co-ordination of a reference track (adjacent track or monitoring recording track). In the prior art of seismic exploration, the errors are relatively high (max range of error: ±0.6 ms~±2.5 ms). The inflexion point approach applicable to single track recording is of a relatively high error, the max error thereof is up to 2.2 ms.

It should be noted that, for the above mentioned prior art, only the inflexion point approach (differential approach) and partially smooth AR model approach are directed to the first arrival time (moment) itself, and the first arrival time is obtained with relative indirect methods, in the other approaches, they are not approaches for obtaining the first arrival time.

OBJECT OF THE INVENTION

The object of the present invention is to provide a low cost, easy to practice method and a apparatus for detecting detonation time in industrial application to overcome the inaccuracy and expensive determination of measuring detonation time existing in the prior art.

It is another object of the present invention to provide a method and a apparatus for acquiring the first arrival time of seismic wave with reduced errors and high accuracy in real time to overcome the drawback of unreliability in acquisition of the first arrival time of seismic wave under the condition of using single detector.

SUMMARY OF THE INVENTION

The present invention provides a apparatus used for measuring the detonation time in the seismic exploration field. The above-mentioned apparatus includes following components:

the detonation means;

the signal measuring means connecting the high voltage detonation means with the detonator and used for measuring current and voltage of the means;

and the signal-processing means linked to the outlet thereof and used for real-time processing the output of the measuring means, calculating the general impedance curve on of detonator and linking to the detonation line thereof, the signal processing means may determine the detonation time (time break or CAP break). Furthermore, in order to smooth filter noise and interference to enhance accuracy of the measurement, a test signal generating means (connecting between the high voltage detonation means and the signal measuring means) has been provided and used for adding to the detonation circuit a $\omega$-frequency sine wave test signal, forming the current intensity and voltage measured by the signal measuring means, the above-mentioned signal processing means will detect current and voltage with same frequency as $\omega$-frequency test signal accordingly.

The method used for measuring detonation time TB includes following steps: a) to measure current and voltage of the detonation circuit by the signal measuring means; b) to ignite the detonator with the high voltage detonation means and then to ignite the dynamite hole; c) the signal measuring means will detect current and voltage signal in the detonation circuit and transmit to the signal processing means; d) the signal processing means will calculate a general impedance curve by measuring its current and voltage, and by searching cycles of drastic changes of the curve to determine the detonation time TB. Furthermore, in order to smooth filter out noise and interference to enhance accuracy of measurement, a $\omega$-frequency sine wave test signal has been added to the detonation circuit by using a test-signal generating means in step a),and accordingly, in step d) the signal processing means will detect and measure current and voltage with same frequency as the $\omega$-frequency test signal from current and voltage measured by the signal measuring means, and thus to compute the curve of impedance changes and, in some extent to eliminate noise and interference and to determine accurately the initial detonation time TB.

The present invention provides also a apparatus used for measuring the first arrival time TR of seismic first arrival waves at the uphole (or detector) in seismic exploration. This apparatus includes one or several detector placed on the ground near the detonation upholes and used for measuring seismic waves and converting them to electrical signals, and a signal processing means coupled to the output of the detector, used for processing outputted electrical signals thereof in order to determine the accurate first arrival time of seismic first arrival waves in real time.

The method used for measuring the first arrival time TR of seismic first arrival waves in the seismic exploration includes the steps, as follows: a) By using one or several detector placed on the ground near the detonation holes to measure seismic waves permanently and convert the seismic wave signals into electrical signals for output; b) By using a signal processing means connected with the output of the detector to carry out a real time processing of signals outputted from the detector in order to determine the accurate first arrival time of seismic first arrival waves, wherein step b) further includes the steps, as follows:

1) to get samples of signals outputted from the detector and quantize them into digital ones, then specify as an initial recorded signal $Wi(t)$.

2) by using a first time window $[t \sim t+twin1]$ of size twin1, to carry out an average energy calculation and record the output as $Ea(t)$;

3) to set a threshold value e for $Ea(t)$, specify the time when $Ea(t)$ changes from less than e to greater than e as ts, and determine preliminarily that the first arrival wave has arrived, 4) after ts, by obtaining the time of appearance of the first extreme value of $Ea(t)$, specify it as tf, which can indicate the approximate location of the ¼ cycle of the first wave of first arrival waves;

5) by using a second time window $[t-twin2/2 \sim t+twin2/2]$ of size twin2, starting from time tf, to carry out a mean energy calculation and record it as $Ej(t)$, wherein twin2>twin1, twin2 being selected so as to be enough to cover the first arrival time of the seismic wave. If $Ej(f)>e$ within time cycle twin2 following tf and keeps up a rising tendency, then the actual arrival of the first arrival waves could be determined, otherwise, after founding a t' when $Ea(t')<e$, return to step 3) to repeat said processing step from t=t';

6) upon $Wi(t)$, to approximately determine the jump time Tj of the first arrival wave, then to use the spectrum features of the first arrival wave to determine preliminarily whether this check is valid, if the difference between the jump time of the first arrival wave and the time tf is less than a threshold TW, it indicates that this check is valid, otherwise, it indicates that this check is invalid due to appearance of a large interference, so the process procedure can be viewed as terminated;

7) to smooth filter $Wi(t)$ by using various smooth filtering methods, then to search $Wi(t)$ backward from time tf to obtain a series of zero crossing points as sample values of first arrival time, then to calculate the mathematical expectation ta of said sequence of sample values in the vicinity of ts (after ts when the window is of small size, or before ts when the window is of large size) by statistic means;

8) to use $[ta-td \sim ta+td]$ as a specified range for removing the exceptional data outside the range, and calculate the mathematical expectation of the remaining sample values as ta, then with replacement of old ta by new ta and reduction of td, and repeat this step until the number of said samples inside the range $[ta-td \sim ta+td]<K$ (as a threshold) so as to make ta converge in a smaller range;

9) to select m samples of the first arrival time $t(n)$ in the vicinity of ta, to observe the sample values of $Wi(t)$ by means of time window $[t(n)-tb \sim t(n)+tb]$ so as to select the sample values $t(n)$ of first arrival time at which the sum of the values of $Wi(t)$ within time window $[t(n)-tb \sim t(n)+tb]$ is smaller than a threshold $\epsilon$, finally, to determine first arrival time TR more accurately, then one of these values with the polarity direction from the first arrival wave being most adjacent to zero is taken as the first arrival time and recorded as $TR_0$, and the process procedure is terminated.

A BRIEF DESCRIPTION OF THE DRAWINGS

DETAILED DESCRIPTION OF THE INVENTION

Figure 1:
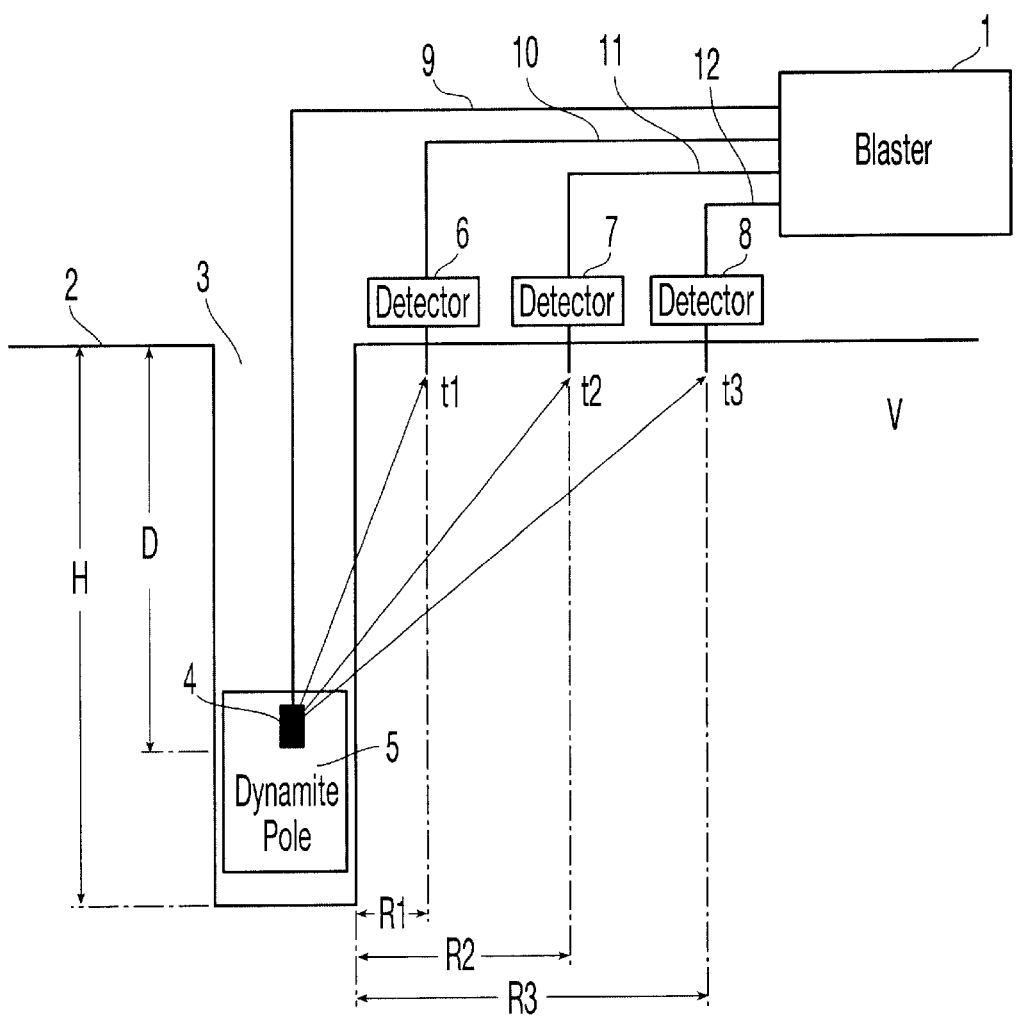
FIG. 1 shows a diagram of a blaster apparatus used for obtaining the accurate propagation time from the detonation point to the uphole (or detector) and the depth of the point of detonation according to one embodiment of the invention.

In following paragraphs along with drawings a more detailed description will be given for describing the present invention:

In FIG. 1 the means and the method described according the present invention were used for obtaining the propagation time and detonation depth. Dynamite pole 5 and detonator 4 as the source of seismic waves are placed in detonation hole 3, detonator 4 is placed in dynamite pole 5 which is linked via detonation line 9 to HV+ and HV− of the high voltage output outlet of blaster 1.

There are at least 3 detectors 6, 7, 8, in the surface 2 being perpendicular to the detonation hole. It is multi-point-detection line. All the detector are in one straight line of the same level. Every detector is connected to the blaster 1 respectively via wires 10, 11, 12. The distance $R_3$ between uphole and the farthest detector station 8 is less than hole depth H.

Figure 2:
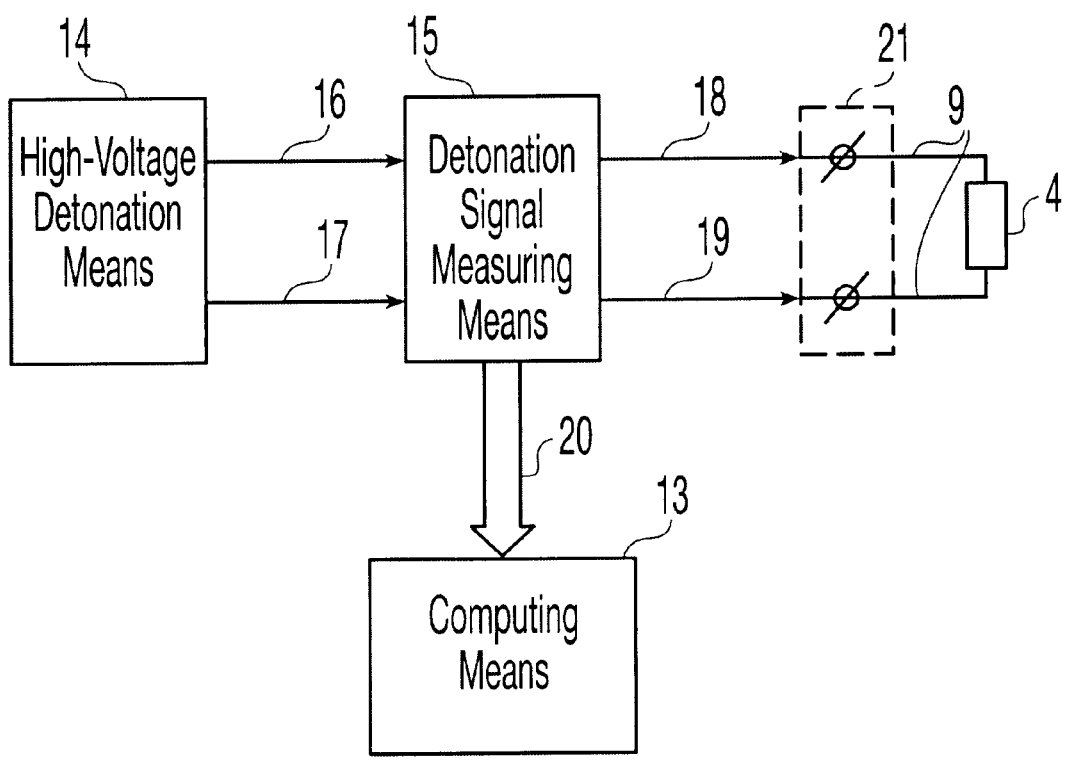
FIG. 2 shows a diagram of the apparatus used for detecting the detonation time (CAP break time) according to one embodiment of the invention.

FIG. 2 is showing the means of the present invention used for determining detonation time, it is composed of the high-voltage detonation means 14, detonation signal measuring means 15 and computing means 13.

The high-voltage output from the high-voltage detonation means 14 is connected to detonation signal measuring means 15 via wire 16 and wire 17, then the high voltage from detonation signal measuring means 15 is linked to detonation-line 9 via wire 18 and wire 19. In the end the high voltage is added onto the detonator 4. During detonation, the high-voltage detonation means 14 ignites the detonator 4, and the detonation signal measuring means 15 pickups the current and voltage signal of the detonation means and convert them into digital signal. Then the digital detonation signal data is sent to the signal processing means 13 via data bus 20.

Figure 3:
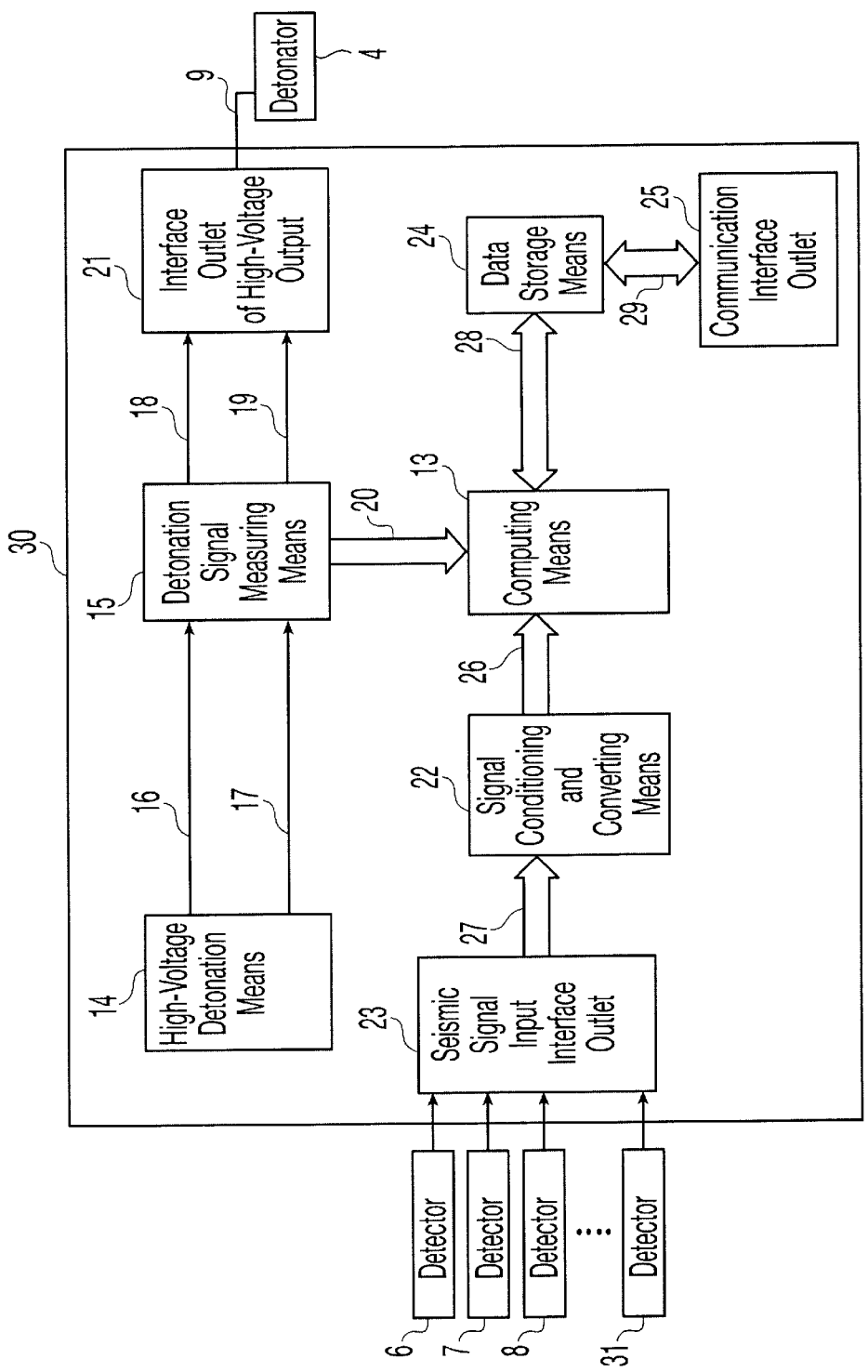
FIG. 3 shows a diagram of the blaster apparatus used for measuring the accurate uphole time from the detonation point to the uphole and the depth of the point of detonation according to another embodiment of the invention.

As shown in FIG. 3, we can get the accurate uphole time (τ value) and detonation depth with the seismic blaster which is an example of application of the present invention. The new type of the blaster, as a whole, is composed of shell 30, signal conditioning and converting means 22, the high-voltage detonation means 14, detonation signal measuring means 15, computing means 13, data storage means 24, interface outlet of high voltage output 21, seismic signal input interface outlet 23 and communication interface outlet 25.

The high voltage from the interface outlet of high voltage output 21 is linked to the detonator 4 in hole 3. During detonation, the high-voltage detonation means 14 ignites the detonator 4, the detonator ignites the dynamic pole 5 in the hole 3. Then the seismic wave is generated. During detonation, the detonation signal measuring means 15 pickups the current and voltage signals of detonation means, and converts it into digital signal by a A/D conversion. Then the digital signal detonation data is sent to computing means 13 to do data processing via data bus 20.

The seismic wave from the detonation point travels to the detector stations, and then it is detected by the first detector 6, second detector 7, third detector 8 . . . nth detector 31. The detector line is connected to seismic signal input interface outlet 23 of the blaster 1, so the seismic signal is inputted into the signal conditioning and converting means 22 via the internal seismic signal connection cable 27. The analog seismic signal from each detector will be conditioned and be converted into the digital signal. The results will be sent to the signal processing means 13 to do data processing via data bus 26.

Computing means 13 will send all kinds of data to data storage means 24 via the data bus 28. If necessary, the data will be transmitted to remote host to record by communication device, which is connected to the communication interface outlet 25.

Figure 4:
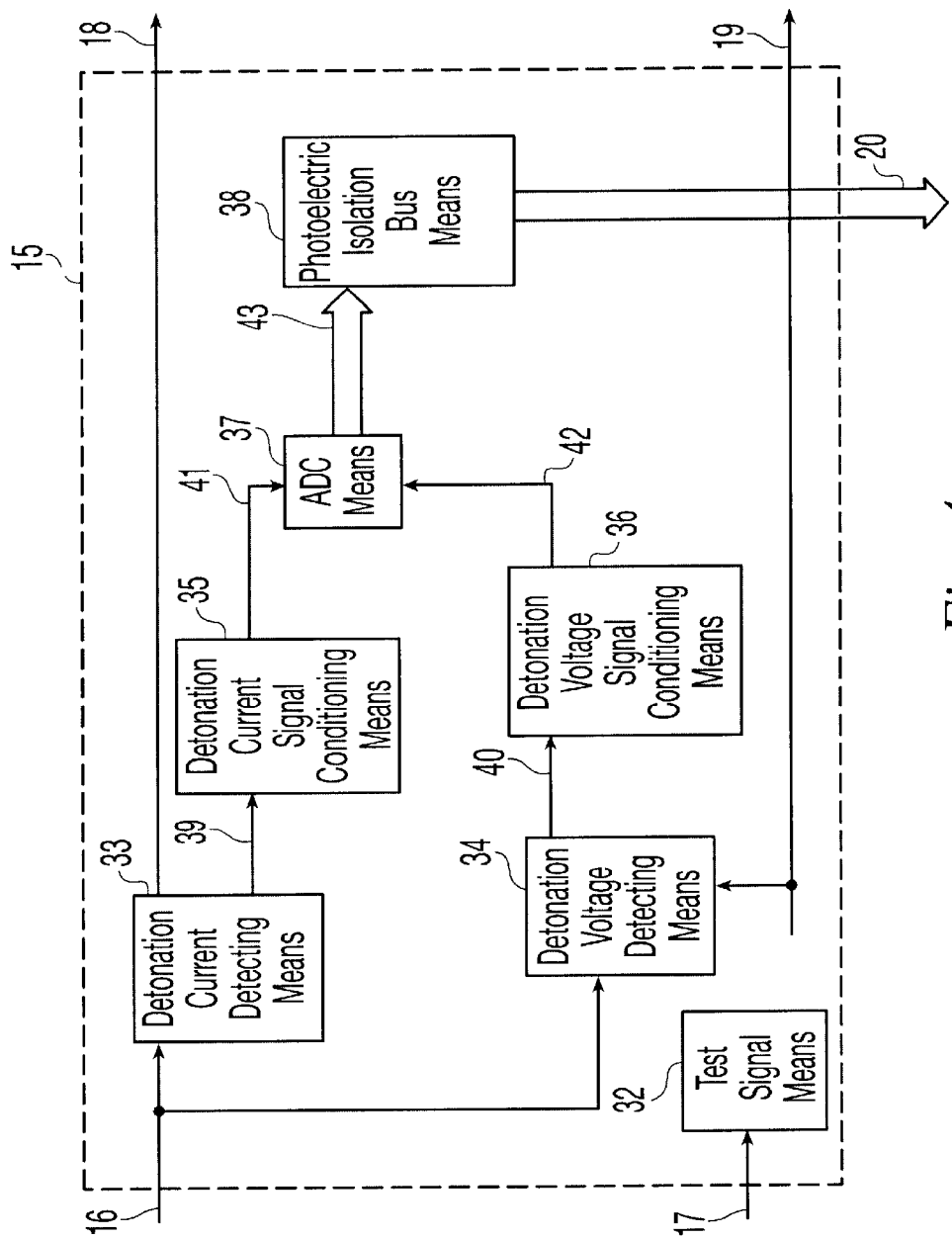
FIG. 4 shows a diagram of a detonation signal measure means according to another embodiment of the invention.

FIG. 4 is the detonation signal measuring means 15 of the invention. It includes: test signal means 32, detonation current detecting means 33, detonation voltage detecting means 34, detonation current signal conditioning means 35, detonation voltage signal conditioning means 36, ADC means 37, and photoelectric isolation bus means 38.

During detonation, the two nodes of the high-voltage detonation capacitor in the high-voltage detonation means 14 are connected to wire 16) and wire (17. There are high voltages of several hundred volts between wire 16 and wire 17. At the same time the test signal means 32 adds a sine wave test signal between wire 16 and wire 17. The sample-resister of the detonation current detecting means 33, which is serial linked between wire 16 and wire 18, is very small. So the voltage between wire 18 and wire 19 is the sum of the high voltage outputted from detonation means 14 and voltage outputted from test signal means 32. The detonation current detecting means (33) pickups the detonation current between wire 16 and wire 18 and converts into voltage signal. Then the detonation-current signal is inputted to detonation current signal conditioning means 35 via wire 39. At last, the detonation-current signal is sent to ADC means 37. The detonation voltage detecting means 34 pickups the detonation voltage between wire 16 and wire 19. Then the detonation-voltage signal is inputted to detonation current signal conditioning means 36 via wire 40. At last, the detonation-voltage signal is sent to ADC means 37. After analog signals of the detonation-current signal and the detonation-voltage signal are converted into digital signal. The results are sent to the signal processing means 13 via data bus 20 after isolated by photoelectric isolation bus means 38.

The Software algorithm of the signal processing means 13 completes these functions as follows:

54.During detonation, a DSP algorithm is performed in computing means 13. During detonation the impedance of the detonation means 14 sharply changes, and the detonation system is unstable, According to this character, the signal processing means 13 analyzes the detonation-current and the detonation-voltage signals in real-time, then determining the detonation time of the detonator. After that, the detonating time (so-called time break or TB) will be transferred to the remote host to record via storage means. 24.

The method of determining the detonation time is completed as following processing:

During detonation, the detonation-voltage signal v, which is detected by the detonation signal-measuring means 15, is composed of three parts: The first is the high voltage $v_h$ of the detonation capacitor, which is the output voltage of the high-voltage detonation means 14. The second is the test signal $v_t$ of the test signal means 32, which is strong signal of sine wave. The third is noise signal of the system. In the meantime, the detonation-current signal i, which is detected by the detonation signal measuring means 15, is also composed of three parts: The first is the high-voltage output current $i_h$ from the detonation capacitor of the high-voltage detonation means 14. The second part is the test signal $i_t$ from the test signal input means 32. The third is noise signal of the system.

The definition of total impedance of detonator and detonation-line:

$$Z = \frac{v}{i} \text{ or } Z = \frac{v_t}{i_t}$$

The signal processing means 13 calculates total impedance of detonator 4 and detonation-line 9 according to the above equation. Then we will have an impedance curve. This impedance curve is corrupted by high voltage impulse generated by the detonation means 14. It means that there is a big noise in it. In order to suppress noise, we use test signal. Because we know the impedance of the test signal means 32 and the frequency of the test signal, we can use digital smooth filtering algorithm (such as x-11 algorithm) to decompose the current and voltage signal into three components: 1. Trend component; 2. Cycle component; 3. Irregular component.

We can get an impedance curve of $v_t$ and $v_t$, which are extracted from detonation-voltage and detonation-current. By analyzing this curve and finding the time section where the curve sharply changes, we will get to know the detonation time correctly.

Figure 5:
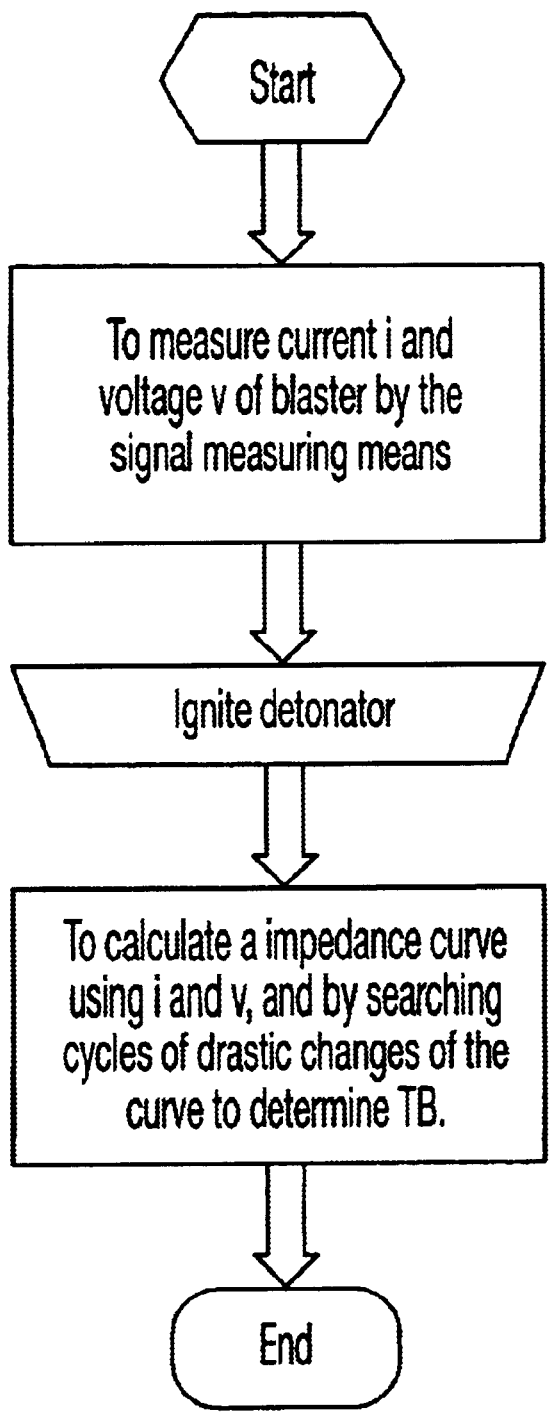
FIG. 5 is a flowchart of a method for measuring detonation time according to one embodiment of the invention.
Figure 6:
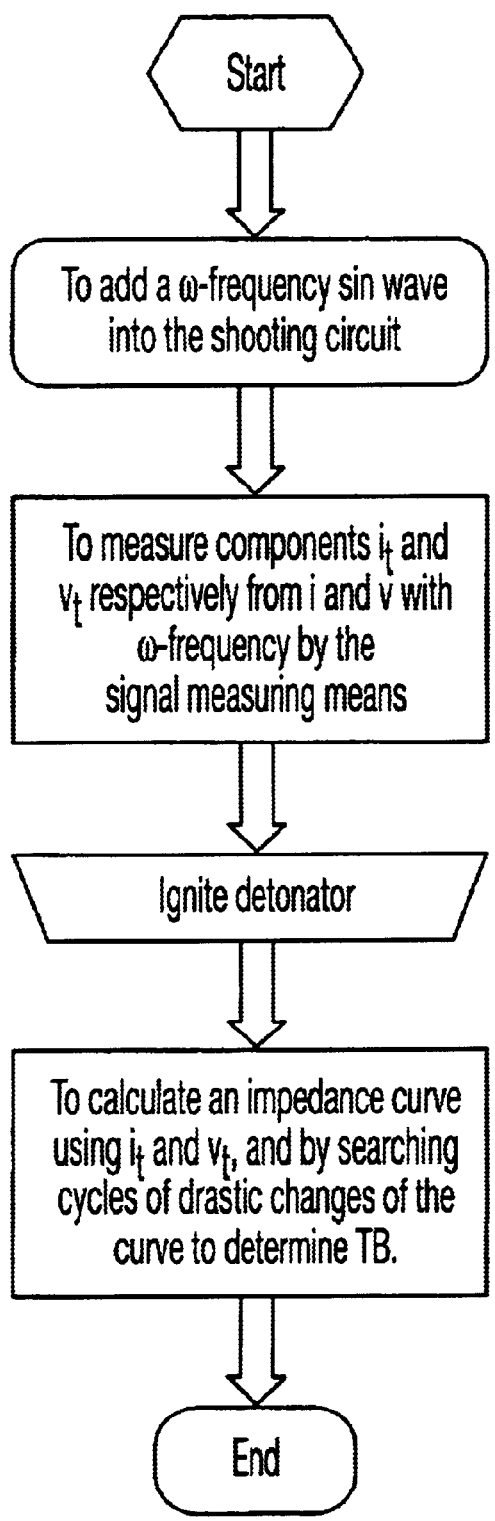
FIG. 6 is a flowchart of a method for measuring detonation time according to another embodiment of the invention.

The determination of the detonation time TB is made by the above-mentioned method, as shown in FIG. 5 or 6.

After detonation, a kind of artificial intelligence algorithm is performed in the computing means 13, and the seismic data of every detector station is analyzed in real-time. According to the characteristic of energy, phase and frequency of the first arrival wave, we can distinguish the First-arrival wave and get the time of the first wave arrives rightly.

Figure 7:
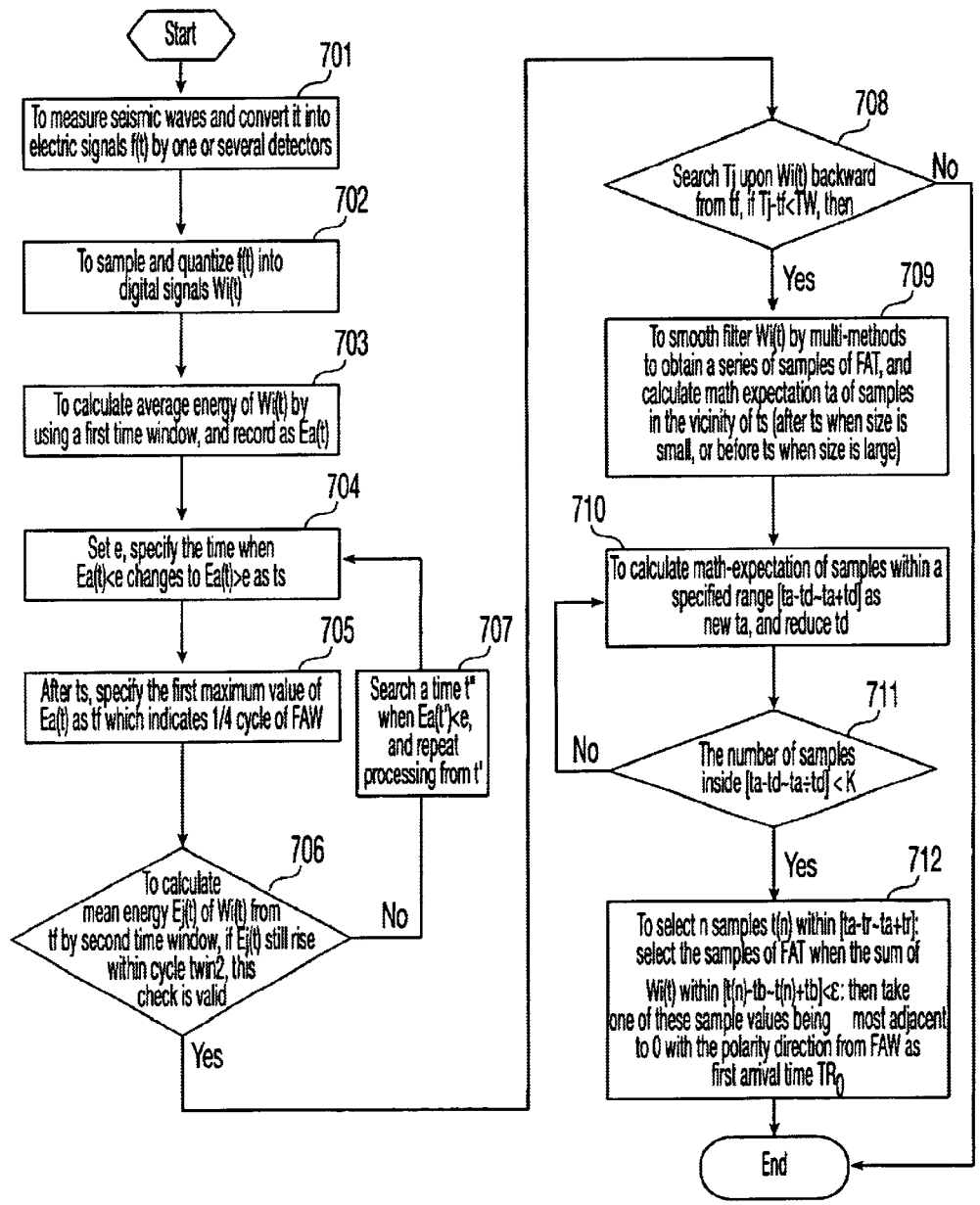
FIG. 7 is a flowchart of a method for measuring the first arrival time of seismic wave according to one preferred embodiment of the invention.

The determining of the first arrival time is implemented according to the method as follows, as shown in FIG. 7:

(1) to carry out high precision sampling by a over-sampling method used for detecting signals (sampling rate >20 KHz, number of digits >12 bits), and specify it as Wi(t), as shown in step 702.

(2) to carry out a mean-energy calculation of Wi(t) (t~t+4 mns) with a time window measured by 4 ms, and specify it as Ea(t). It can be seen that Ea(t) comes earlier than Wi(t), as shown in step 703.

(3) to set a threshold value for Ea(t), specify the time when Ea(t) changes from less than e to greater than e as ts, and determine preliminarily that the first arrival wave has arrived, as shown in step 704. Selection of e is determined not only by interference, it is determined mainly by intensity of first arrival signals, interference is used only for setting limit to the minimal value of e. E can be changed according to necessity, but it was revealed in practice that it has very strong jam-resisting ability while taking for e the energy value within time window 4 ms of 10% of the full-scale value of the sample recorded by the system. By the same reason, e is either applicable for Ej(t).

(4) after ts, try to get the time when appears a peak value of Ea(t) for first time, and specify it as tf, as shown in step 705 which can indicate the appropriate location of ¼ cycle of the first wave of first arrival waves, i.e. to confirm by ts and tf the time cycle when first arrival wave is expected to be analyzed further.

(5) by using a second time window [t−10 ms~t+10 ms] of size 20 ms, starting from time tf, to carry out a mean energy calculation and record it as Ej(t), wherein 20 ms is enough to cover the first arrival time of seismic waves so as to check out whether the conclusion of the step 3) on the arrival of the first arrival wave is correct, if Ej(f)>e within time cycle 20 ms following tf and keeps up a rising tendency, then the actual arrival of the first arrival waves could be determined, otherwise, return to step 3) after founding a time t when Ea(t)<e; If the case can not meet the conditions, it is necessary to search after ts another time t ' when Ea(t)<e. Then return (4) to to continue searching a time when Ea(t)>e from the searched time t=t' and specify it as ts, as shown in step 706 and 707. By this way it is possible to eliminate jam impact on the reading apparatus and to ensure that the above-analyzed first arrival time was made on first arrival wave.

(6) upon Wi(t), to approximately determine the jump time Tj of the first arrival wave, then to use the spectrum features of the first arrival wave to determine preliminarily whether this check is valid, if the difference between the jump time Tj of the first arrival wave and the time tf is less than a 15 ms, it indicate that this check is valid, or this check is invalid due to appearance of a large interference, so the process procedure can be viewed as terminated, as shown in step 708;

(7) to smooth filter Wi(t) by using various smooth filtering methods (such as 3, 5, 7, 9, 11 point of the midpoint filter algorithm), then to search the zero-crossing point backward from time tf to obtain a series of sample values of first arrival time, then to calculate the mathematical expectation ta of said sequence of sample values in the vicinity of ts (after ts when the window is of small size, or before ts when the window is of large size) by statistic means, as shown in step 709;

(8) Set td a initial value as 3 ms, then use [ta~td−ta+td] as a specified range for removing the exceptional data outside the range, after that, calculate the mathematical expectation ta, then with replacement of old ta by new ta and reduction of td as [td=td-lms], repeat the present step (8) until the number of said samples inside the range [ta~td~ta+td]<3 so as to make ta converge in a smaller range, as shown in step 710 and 711;

(9) to select 5 samples of the first arrival time t(n) (n=1, 2, 3, 4, 5) in the vicinity of ta, to observe the sample values of Wi(t) by means of time window [t(n)−0.5 ms~t(n)+0.5 ms] so as to select the samples values t(n) of first arrival time at which the sum of the values of Wi(t) within time window [t(n)−0.5 ms~t(n)+0.5 ms] is smaller than a threshold $\epsilon$($\epsilon$=5 mV), finally, to determine first arrival time TR more accurately, then one of these values with the polarity direction from the first arrival wave being most adjacent to zero is taken as the first arrival time and recorded as $TR_0$, as shown in step 712, and the process procedure is terminated.

After the first arrival time of the nearest detector station to the hole has been worked out, the computer calculates the propagation (traveling) time ($\tau$ value), and then transmit the propagation (traveling) time ($\tau$ value) to host for recording. After that, the signal processing means 13 computes the first arrival time of other detector stations. Then utilizing a group of mathematics formula of multi-point detection, it computes the detonation depth D.

The detonation depth is measured by the following step:

By using n detectors placed on the ground surface and according to the method mentioned above to detect the various first arrival times of the seismic first arrival waves TR1, TR2, TR3, . . . TRn, and take away TB, then it will be a series of propagation (traveling) time $\tau1, \tau2, \tau3, \ldots \tau n$ recorded by various detectors. Measure the level distance from detectors to upholes R1, R2, R3, . . . , Rn; and by using the following formula Cn it is possible to get D values of Cn (D1, D2, D3, . . . Dn);

$$\frac{t1}{t2} = \sqrt{\frac{D^2 + R_1^2}{D^2 + R_2^2}},$$

$$\frac{t1}{t3} = \sqrt{\frac{D^2 + R_1^2}{D^2 + R_3^2}}, \frac{t2}{t3} = \sqrt{\frac{D^2 + R_2^2}{D^2 + R_3^2}},$$

...

$$\frac{t1}{tn} = \sqrt{\frac{D^2 + R_1^2}{D^2 + R_n^2}}, \frac{t2}{tn} = \sqrt{\frac{D^2 + R_2^2}{D^2 + R_n^2}}, \ldots, \frac{tn-1}{tn} = \sqrt{\frac{D^2 + R_{n-1}^2}{D^2 + R_n^2}}$$

Finally, by using above-mentioned formula $C_n^2$ get the D values of Cn (D1, D2, D3, . . . Dn), then by using following formula to accurately calculate D value $$D = \frac{1}{C_n^2} \sum_{i=1}^{C_N^2} D_i$$

Although the present invention has been described based of specific embodiments, the invention is by no means restricted thereto, and is much rather defined by the appended claims. The people skilled in the art can make some modifications or changes within the scope of the invention.

What is claimed is:

1. A method for measuring the first arrival time TR of seismic first arrival waves in the seismic exploration, wherein the method comprises:

using a or several detectors to measure seismic waves and convert said seismic wave signals into electrical signals;

using a signal processing means connected with the output of said detector to carry out a real time processing of signals outputted from the detector in order to determine the accurate first arrival time of seismic first arrival waves, wherein the signal processing means performs at least the following steps:

a) getting samples of signals outputted from the detector and converting them into signals, and specifying an initial recorded signal $Wi(t)$;

b) using a first time window of size twin1 to carry out an avenge energy calculation and record the outcome as $Ea(t)$;

c) setting a threshold value e for $Ea(t)$, specifying the time when $Ea(t)$ changes from less than e to greater than e as ts, and determining preliminarily that the first arrival wave has arrived;

d) after time ts, obtaining the time of appearance of the first maximum value of $Ea(t)$, and specifying it as tf, which can indicate the approximate location of the ¼ cycle of the first wave of first arrival waves;

e) using a second time window of size twin2, starting from time ts, carrying out a mean energy calculation and recording it as $Ej(t)$, wherein twin2>twin1, with the purpose to check out whether the conclusion of step c) on the arrival of the first arrival wave is correct; if $ej(t)>e$ within time cycle twin2 following tf and keeps increasing, then the actual arrival of the first arrival waves is determined; otherwise, then after finding time $t^1$ when $Ea(t^1)<e$, repeating step c) from $t=t^1$;

f) upon $Wi(t)$, approximately determining the jump time Tj of the first arrival wave, then using the spectrum of the first arrival wave to determine preliminarily whether this check is valid; if the difference between the jump time Tj of the first arrival wave and the time tf is less than a threshold time TW, then it indicates that this check is valid; otherwise, it indicates that the check is invalid due to interference, so the procedure can be terminated;

g) smoothing $Wi(t)$ by using a smooth filtering method; then searching $Wi(t)$ backward from time tf to obtain a series of zero crossing points as sample values of first arrival time; then calculating the expectation time ta of said sample values in the neighborhood of ts (before ts when the window is of small size, or after ts when the window is of large size) by statistic means;

h) using as a specified range for removing the exceptional data outside the range; calculating the expectation time ta; and replacing old ta with new ta and reducing td; repeating step h) until the number of said samples inside the range <K to make ta convergent;

i) selecting n samples of the first arrival times $t(n)(n1, 2, 3 \ldots n)$ in the neighborhood of time ta; observing the sample values of $Wi(t)$ by means of a third time window ;selecting the sample values $t(n)$ of first arrival time TR at which the sum of the values of $Wi(t)$ within time window is smaller than a threshold $\epsilon$; determining first arrival time TR more accurately; and then one of these values with the polarity direction from the first arrival wave being most adjacent to zero is taken as the first arrival time and recorded as $TR_0$, and the procedure is terminated.

2. A method for measuring the first arrival time of the seismic waves according to claim 1, wherein, the threshold value e will take the energy value of 10% of the ADC's full-scale recorded sample within time window 4 ms.

3. A method for detecting the first arrival time of the seismic waves according to claim 1, wherein, the first time window twin1 is chosen as 4 ms, the second time window twin2 is chosen as 20 ms, and TW is chosen as 15 ms.

4. A method for detecting the first arrival time of the seismic waves according to claim 1, wherein, K is chosen as 3; and when repeating step h), K is first chosen as 3 ms, and then 1 ms thereafter, while tb is chosen as 0.5.

5. An apparatus for measuring the first arrival time TR of the seismic waves in the seismic exploration according to claim 1, comprising:

at least one detector for detecting seismic waves and converting the seismic waves into electric signals; and a signal processing means connected with the output of the detector for processing electric signals to find accurate first arrival time of seismic waves in real time.

* * * * *